(12) United States Patent
Bingham et al.

(10) Patent No.: US 6,305,265 B1
(45) Date of Patent: Oct. 23, 2001

(54) METHOD AND APPARATUS FOR PRESSURIZING VAPOROUS FLUIDS

(75) Inventors: Dennis N. Bingham; Russell L. Ferguson, both of Idaho Falls, ID (US)

(73) Assignee: Bechtel BWXT Idaho LLC, Idaho Falls, ID (US)

( * ) Notice: Subject to any disclaimer, the term of this patent is extended or adjusted under 35 U.S.C. 154(b) by 0 days.

(21) Appl. No.: 09/324,890

(22) Filed: Jun. 3, 1999

(51) Int. Cl.[7] ........................................ F16J 15/18
(52) U.S. Cl. .................. 92/168; 92/249; 277/452
(58) Field of Search .............................. 92/144, 165, 168, 92/249, 253; 417/901; 277/452

(56) References Cited

U.S. PATENT DOCUMENTS

| | | | |
|---|---|---|---|
| 3,114,326 | * 12/1963 | Yaindl | 92/144 |
| 3,145,629 | * 8/1964 | Gottzmann | 92/144 |
| 3,632,235 | * 1/1972 | Grenci | 417/901 |
| 5,456,629 | 10/1995 | Bingham . | |
| 5,733,174 | 3/1998 | Bingham et al. . | |

* cited by examiner

*Primary Examiner*—Edward K. Look
*Assistant Examiner*—Thomas E. Lazo
(74) *Attorney, Agent, or Firm*—Klaas Law O'Meara & Malkin

(57) ABSTRACT

Pump apparatus according to the present invention may comprise a pump body having a bore therein and a piston mounted within the bore so that the piston may be reciprocated within the bore between first and second positions. A sleeve seal assembly mounted to the pump body contacts the piston as the piston moves between the first and second positions. A piston seal assembly mounted to the piston contacts the bore in the pump body and is located on the piston so that the piston seal assembly does not contact the sleeve seal assembly as the piston is reciprocated between the first and second positions within the bore of the pump body.

22 Claims, 4 Drawing Sheets

METHOD AND APPARATUS FOR PRESSURIZING VAPOROUS FLUIDS

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

FIELD OF THE INVENTION

This invention relates to high pressure pumping apparatus in general and more specifically to high pressure pumping apparatus having improved performance over wide temperature and pressure ranges.

BACKGROUND OF THE INVENTION

Pumps for pumping liquids and other materials at very high pressures are well-known in the art and have been used for decades in a wide range of applications. Generally speaking, pumps capable of pumping liquids at pressures greater than about 4,000 pounds per square inch gauge (psig) are referred to in the art as "intensifier pumps," although the usage is somewhat inconsistent and may or may not be used to describe pumps capable of pumping liquids at or above the foregoing pressure.

Generally speaking, most high pressure or intensifier pumps are used in the final stage of a multi-stage pumping system in which one or more low and/or intermediate pressure pumps may be operated in successive stages to pre-pressurize the material before it is fed to the high pressure intensifier pump. The high pressure intensifier pump then increases the pressure of the material to the final desired high pressure.

A typical high pressure intensifier pump may comprise a piston mounted for reciprocation within a bore or cylinder. As the piston moves back and forth within the cylinder, the material being pumped is alternately drawn into the cylinder via the pump inlet and then compressed by the piston. The pressurized material is then discharged via the pump outlet. The piston may be reciprocated by any of a wide range of systems and devices well-known in the art for such purposes. For example, the piston may be reciprocated by a cam or crank type of actuator (i.e., by mechanical means) or by a hydraulic pump. If a hydraulic pump is used to reciprocate the piston, the hydraulic pump may comprise a separate or integral component of the high pressure intensifier pump. In one commonly used configuration, the hydraulic pump comprises an integral portion of the high pressure pump, with one end of the high pressure piston being connected directly to the hydraulic piston. The surface or face area of the hydraulic piston is selected so that it is greater than the surface or face area of the high pressure piston. Consequently, hydraulic fluid under a relatively low pressure will be capable of moving the high pressure piston against the material being pumped to produce the high pressure discharge. Indeed, it is not uncommon for intensifier pumps having the foregoing configuration to pump materials at pressures in excess of 60,000 psig with hydraulic fluid pressures of only about 3,000 psig.

While high pressure intensifier pumps of the type described above are being used, they are not without their disadvantages. For example, it is often difficult to provide an effective and reliable seal for the high pressure piston, particularly if the pump is used to pump cryogenic materials, such as liquid nitrogen or liquid oxygen. First, the material used to seal the space between the piston and cylinder must be capable of withstanding without failure the low temperatures associated with such cryogenic materials. Second, the different thermal expansion coefficients of the various materials comprising the many components of the pump (e.g., the piston, piston seal, and cylinder) can result in the formation of relatively large gaps or clearances between the components. For example, when subjected to low temperatures, the piston seal may shrink more rapidly than the piston and cylinder. If the shrinkage is excessive, the seal may no longer effectively seal the gap between the piston and cylinder. While pumps have been developed which are suitable for pumping such low-temperature or cryogenic materials, the seal arrangement and material comprising the seal often precludes the pump from being used to pump other materials or operate at higher temperatures.

A similar situation exists with respect to the pressure ranges within which the pump is to operate. For example, a pump design suitable for intermediate pressure ranges is often not suitable for use at higher pressures and vice-versa.

The foregoing limitations on the temperature and pressure ranges allowable with a given pump design typically mean that different pumps must be used depending on the particular application. Besides requiring a wide inventory of pumps, such a circumstance also precludes the option of using a single pump or a single pump design in more than a few different applications.

SUMMARY OF THE INVENTION

Pump apparatus according to the present invention may comprise a pump body having a bore therein and a piston mounted within the bore so that the piston may be reciprocated within the bore between first and second positions. A sleeve seal assembly mounted to the pump body contacts the piston as the piston moves between the first and second positions. A piston seal assembly mounted to the piston contacts the bore in the pump body and is located on the piston so that the piston seal assembly does not contact the sleeve seal assembly as the piston is reciprocated between the first and second positions within the bore of the pump body.

A method for sealing a gap between a cylinder and a piston mounted for reciprocation within the cylinder may comprise the steps of: Providing a tapered recessed section in the cylinder at an axial location so that the piston remains always adjacent the recessed section as the piston reciprocates within the cylinder; positioning a ring-shaped sleeve seal member in the tapered recessed section of the cylinder; and urging the ring-shaped seal member toward a small diameter end of the tapered recessed section as the piston reciprocates within the cylinder.

Another method for sealing a gap between a cylinder and a piston mounted for reciprocation within the cylinder may comprise the steps of: providing a circumferential groove in the piston that is tapered from a large diameter end to a small diameter end; positioning a ring-shaped piston seal member in the tapered circumferential groove; and urging the ring-shaped seal member toward the large diameter end of the circumferential groove as the piston reciprocates within the cylinder.

Also disclosed is a sleeve seal assembly for sealing a gap between a cylinder and a piston that comprises a ring-shaped sleeve seal member that is positioned within a recessed section in the cylinder. The recessed section is tapered from a large diameter end to a small diameter end and is provided in the cylinder at an axial location so that the piston remains always adjacent the tapered recessed section as the piston reciprocates within the cylinder. A spring positioned adjacent the ring-shaped seal member urges the ring-shaped seal member toward the small diameter end of the tapered recessed section.

A piston seal assembly is also disclosed for sealing a gap between a cylinder and a piston that comprises a ring-shaped piston seal member positioned within a circumferential groove provided in the piston. The circumferential groove is tapered from a large diameter end to a small diameter end. A spring positioned adjacent the ring-shaped piston seal member urges the ring-shaped piston seal member toward the large diameter end of the circumferential groove.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
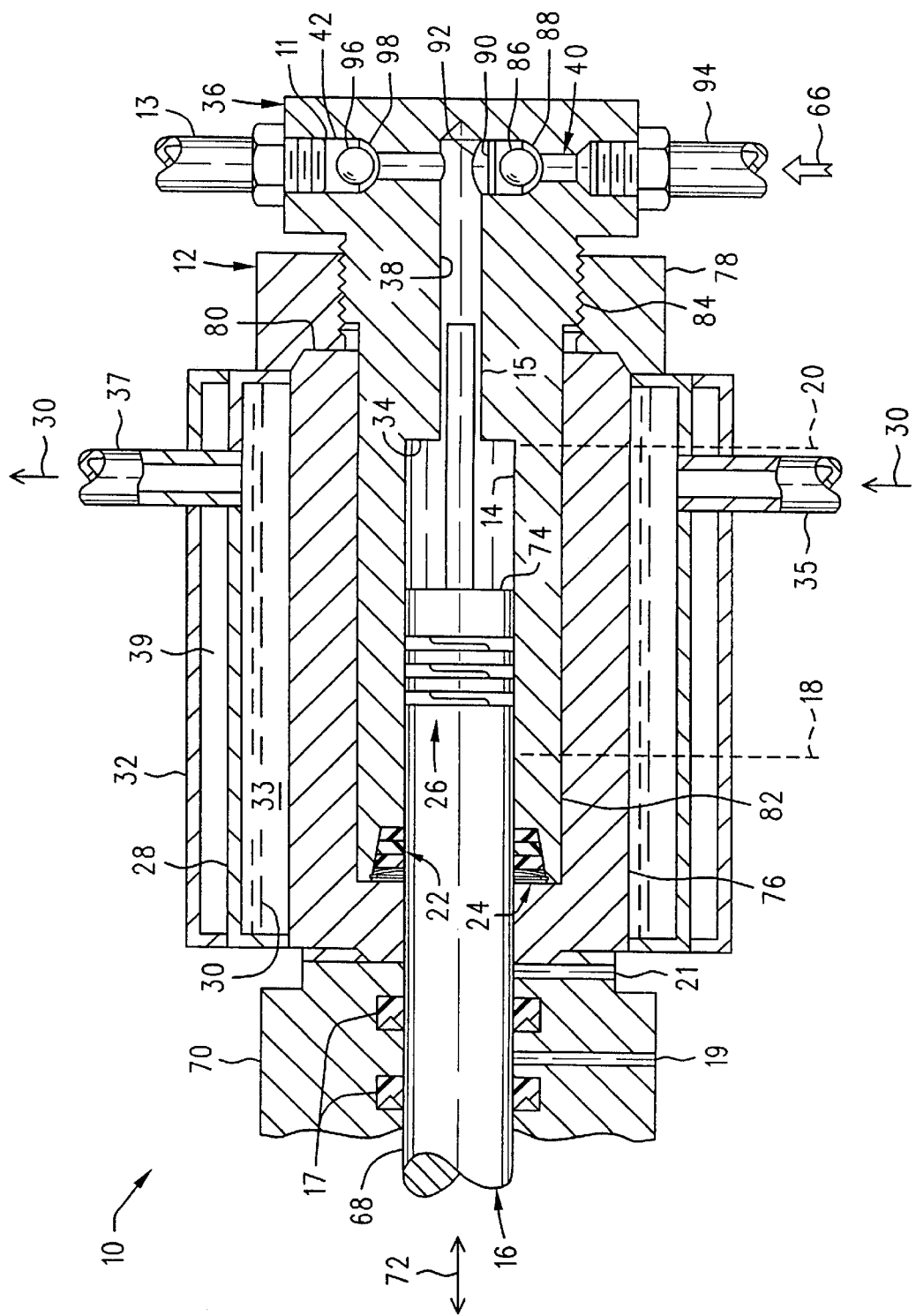
FIG. 1 is a sectional view of a high pressure intensifier pump according to one embodiment of the present invention.

A high pressure intensifier pump 10 according to one embodiment of the present invention is shown in FIG. 1 and may comprise a pump body 12 having a cylindrical bore contained therein that is sized to receive a piston 16. The piston 16 is mounted within the bore 14 so that the piston 16 may be reciprocated back and forth between a first or retracted position 18 and a second or extended position 20. A sleeve seal assembly 22 mounted at about the proximal end 24 of the cylindrical bore 14 seals the gap (not shown) between the piston 16 and the cylinder 14 as the piston 16 is reciprocated within the bore 14. A piston seal assembly 26 mounted to the piston 16 also seals the gap between the piston 16 and the cylinder 14 as the piston 16 is reciprocated within the cylinder 14. In one preferred embodiment, the distal end 34 of the cylindrical bore 14 is fluidically connected to a valve assembly 36 by a passageway 38. The valve assembly 36 may comprise an inlet check valve assembly 40 and an outlet check valve assembly 42. Alternatively, other types of valve arrangements and configurations could be utilized, as will be described in greater detail below.

The pump body 12 may be surrounded by a cooling jacket 28 configured to hold a coolant 30 in contact with the pump body 12, thereby helping to maintain the pump body 12 at a desired temperature or within a desired temperature range. The cooling jacket 28 in turn may be surrounded by an insulating jacket 32 to reduce the heat transferred between the cooling jacket 28 and the surrounding environment.

Figure 2:
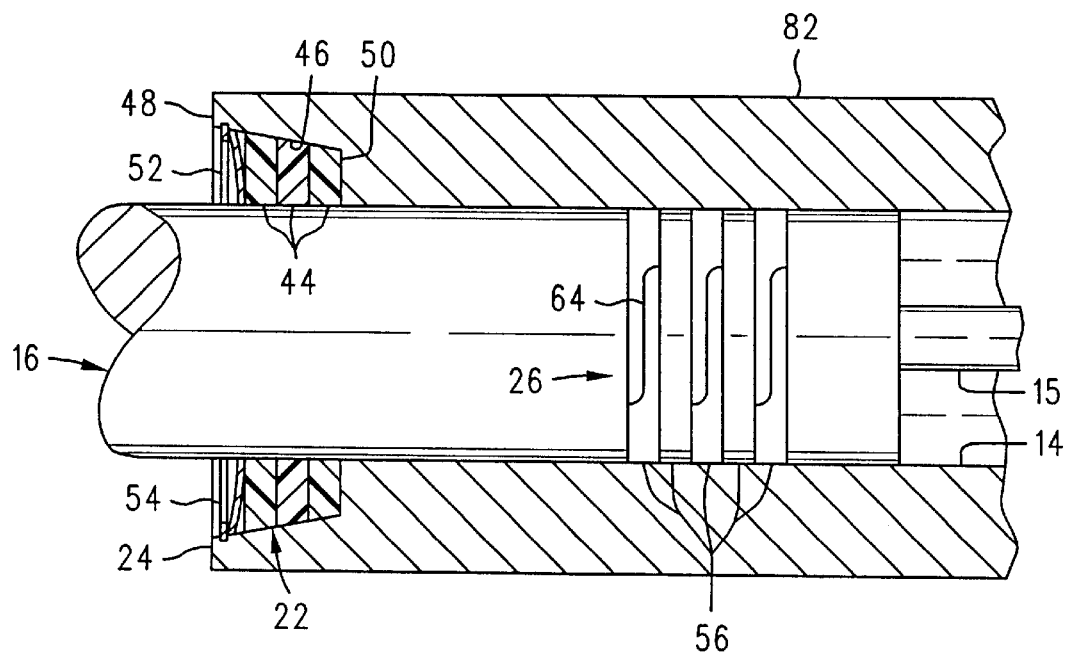
FIG. 2 is an enlarged sectional view in elevation of the piston and pump body showing the sleeve and piston seal assemblies.

Referring now primarily to FIG. 2, the sleeve seal assembly 22 may comprise a plurality of ring-shaped sleeve seal members 44 (FIG. 4) positioned within a recessed section 46 located at the proximal end 24 of bore 14. The recessed section 46 may be tapered from a large diameter end 48 to a small diameter end 50 in the manner best seen in FIG. 2. A spring 52, such as a Belleville washer, may be used to urge the ring shaped sleeve seal members 44 toward the small diameter end 50 of the recessed section 46. Alternatively, other types of spring devices may be used, as will be described in greater detail below. The spring or Belleville washer may be retained within the recessed section 46 by any suitable retaining device, such as by a spring-clip 54.

Figure 3:
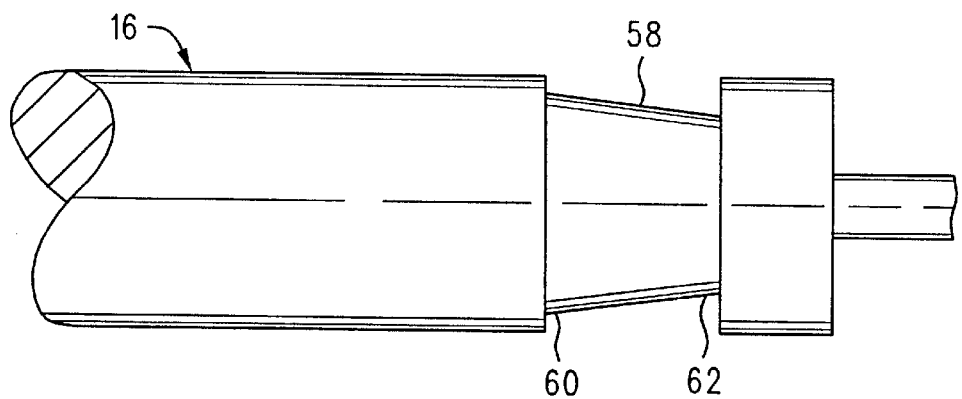
FIG. 3 is an enlarged view of the tapered groove in the piston.
Figure 5:
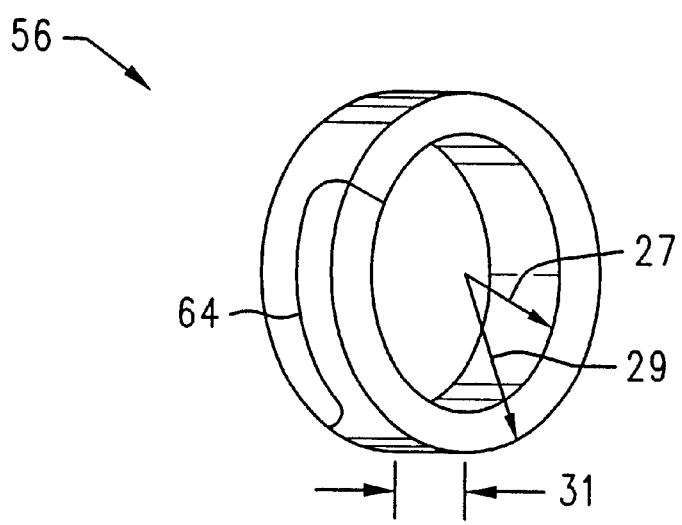
FIG. 5 is a perspective view of a piston seal member showing the "s" shaped gap that may be provided therein.

The piston seal assembly 26 may comprise a plurality of ring-shaped piston seal members 56 (FIG. 5) positioned within a circumferential groove 58 (FIG. 3) provided in the piston 16. In one preferred embodiment, the circumferential groove 58 may be tapered from a large diameter end 60 to a small diameter end 62. It is generally preferred, but not required, that each ring-shaped piston seal member 56 be provided with an "s" shaped gap or slot 64 therein to allow the seal member 56 to expand radially outward without substantially reducing the thickness 31 (FIG. 5) of the seal member 56.

The high pressure intensifier pump 10 may be operated as follows to increase the pressure of a working fluid (represented as arrow 66 in FIG. 1) which may be supplied under pressure to the inlet valve 40 of pump 10 by suitable low or intermediate pressure pump system (not shown). According to one preferred embodiment of the present invention, the piston 16 of the high pressure intensifier pump 10 may be operated by a hydraulic pump apparatus (not shown) in the manner well-known in the art and commonly used to operate the pistons of such high pressure intensifier pumps. Alternatively, a cam or crank type of pump actuator may be used to reciprocate the piston. Consequently, the present invention should not be regarded as limited to any particular type of device to reciprocate the piston.

By way of example, in the embodiment shown and described herein, the proximal end 68 of piston 16 may be connected directly to a hydraulic piston (not shown) contained within a hydraulic cylinder housing, a portion of which is shown in FIG. 1 at 70. A hydraulic control system (also not shown) may be used to reciprocate within the hydraulic cylinder housing 70 the hydraulic piston (not shown) attached to the proximal end 68 of high pressure piston 16. The reciprocating hydraulic piston (not shown) moves the high pressure piston 16 back and forth (as indicated by arrow 72) within the cylinder bore 14 between the retracted and extended positions 18 and 20.

As the piston 16 moves toward the retracted position 18, it draws in the pre-pressurized working fluid 66 through the inlet check valve 40, thereby filling the expanding space between the piston crown 74 and the cylinder bore 14. Once the piston 16 is in the fully retracted position 18, the hydraulic control system (not shown) reverses the pressure on the hydraulic piston (not shown) connected to the proximal end 68 of piston 16, thereby reversing the direction of the piston 16. As the piston 16 advances toward the extended position 20, it compresses the working fluid 66, ultimately discharging it via the outlet check valve 42.

The first seal encountered by the working fluid 66 as it is being pressurized is the piston seal assembly 26. In many applications, the piston seal assembly 26 forms the primary seal, allowing little or substantially none of the working fluid to leak past the seal assembly 26. Since the pressure of the working fluid 66 contained within the cylinder 14 is greater than the pressure on the proximal end 68 of the piston 16, the working fluid 66 exerts a net pressure or force on the piston seal members 56 that is directed toward the proximal end 68 of piston 16. This pressure or force urges the seal members 56 toward the large diameter end 60 of the tapered circumferential groove 58. As a result, the taper in the circumferential groove 58 urges the seal members 56 generally outward, causing them to press more tightly against the cylinder bore 14. The increased pressure of the piston seal members 56 against the cylinder bore 14 enhances the seal provided by the piston seal members 56. As will be described in greater detail below, the "s" shaped gap or slot 64 in each piston seal member 56 allows the seal 56 to expand outward, but without significantly reducing the thickness 31 (FIG. 5) of the seal 56, which would otherwise occur since the seal 56 is made from a resilient material.

While the piston seal assembly 26 effectively seals the piston 16 and cylinder bore 14 in many applications, circumstances may exist, particularly when pumping cryogenic materials (i.e., materials at low temperatures), in which the piston seal members 56 contract to such an extent that they no longer effectively seal the piston 16, even though the tapered circumferential groove 58 compensates for some degree of shrinkage of the seals 56. If so, the sleeve seal assembly 22 operates as the primary seal. Referring now to FIG. 2, any working fluid 66 that leaks past the piston seal assembly 26 will encounter the various sleeve seal members 44 comprising the sleeve seal assembly 22. While the sleeve seal members 44 also experience some degree of shrinkage when operating at low temperatures, the shrinkage of the sleeve seal members 44 causes them to more tightly contact the piston 16, thereby enhancing the effectiveness of the sleeve seal assembly 22, rather than hindering it, as is the case for the piston seal assembly 26. The spring member 52 which biases the sleeve seal members 44 toward the small diameter end 50 of the recessed section 46 further increases the pressure exerted by the seal members 44 on the piston 16, thereby further enhancing the effectiveness of the sleeve seal assembly 22.

If the high pressure intensifier pump 10 is to be used to pump cryogenic materials, then it is generally desirable to circulate a coolant 30 through the cooling jacket 28. The coolant 30 should be selected so that it is at substantially the same temperature as the working fluid 66 contained within the pump 10. For example, if the working fluid (i.e., the fluid being compressed by pump 10) comprises liquid nitrogen, then it will be generally desirable to use liquid nitrogen as the coolant 30. Consequently, the outside portion of the pump body 12 may be maintained at substantially the same temperature as the internal components (e.g., the cylindrical bore 14 and piston 16) of the pump 10, thereby reducing thermal stress on the components and generally increasing pump efficiency. The insulating jacket 32 reduces the heat transfer between the coolant 30 contained within the cooling jacket 28 and the external environment.

A significant advantage of the high pressure intensifier pump 10 according to the present invention is that the combination of the sleeve and piston seal assemblies 22 and 26 allow the pump 10 to be used with far more effectiveness and efficiency and over a wider range of temperatures than is possible with prior art pumps. For example, when the pump 10 is used to pump cryogenic materials (i.e., materials at low temperatures), the primary sealing will be accomplished by the sleeve seal assembly 22. Conversely, when operated at higher temperatures, the sealing of the piston 16 and cylinder bore 14 will be primarily accomplished by the piston seal assembly 26.

The combination of the sleeve seal and piston seal assemblies 22 and 26 of the pump 10 allow the pump 10 to operate over a wide range of pressures and temperatures. For example, in the embodiment shown and described herein, the pump 10 may be used to pump materials at pressures ranging from about 1 megaPascal (about 145 pounds per square inch gauge (psig)) to greater than about 450 megaPascals (about 65,000 psig) and temperatures ranging from about 77 Kelvin or below to 370 Kelvin or greater.

Still other advantages are associated with the tapered recessed section 46 in the cylinder bore 14. For example, the tapered recessed section 46 causes the sleeve seal members 44 to more tightly contact the piston 16 as the spring 52 urges the sleeve seal members 44 toward the small diameter end 50 of the recessed section 46, thereby improving seal effectiveness. The taper provided in the recessed section 46 also helps compensate for seal wear. That is, as the sleeve seal members 44 wear, their inside diameters 21 (FIG. 4) gradually become larger, thereby reducing the pressure exerted by the seal members 44 on the piston 16. The tapered recessed section 46 helps to compensate for such seal wear by slightly compressing the seals 44 against the piston 16 as the spring 52 urges the sleeve seal members 44 toward the small diameter end 50 of the recessed section 46.

The tapered circumferential groove 58 in the piston 16 provides similar advantages with respect to seal effectiveness and wear. That is, the tapered circumferential groove 58 improves the effectiveness of the piston seal assembly 26 by causing the piston seal members 56 to more tightly contact the cylindrical bore 14 as the pressure exerted by the working fluid 66 on the piston seal members 56 urges the piston seal members 56 toward the large diameter end 60 of the tapered circumferential groove 58. The tapered circumferential groove also helps to compensate for the reduced outside diameters 29 (FIG. 5) of the piston seal members 56 resulting from wear, again by causing the seal members 56 to more tightly contact the cylindrical bore 14 as they are urged toward the large diameter end 60 of the tapered circumferential groove 58. The "s" shaped gap 64 provided in the piston seal members 56 reduces the tendency for the thickness 31 (FIG. 5) of the seal 56 to be reduced as the seal 56 expands slightly in the radial direction.

Additional advantages are associated with the cooling jacket 28. For example, by allowing the outside portions of the pump body 12 to be maintained at about the same temperature as the internal components, the cooling jacket 28 reduces the stress on the various components of the pump that may otherwise result from excessive thermal gradients across the various components of the pump 10. Maintaining the pump 10 at a low temperature when pumping cryogenic materials also increases pump efficiency. The insulating jacket 32 surrounding the cooling jacket 28 minimizes heat transfer between the coolant 30 contained within the cooling jacket 28 and the external environment, which generally increases the efficiency of the coolant 30.

Having briefly described one embodiment of the high pressure intensifier pump 10, as well as some of its more significant features and advantages, the various embodiments of the high pressure pump according to the present invention will now be described in detail. However, before proceeding with the detailed description, it should be noted that the various embodiments of the high pressure intensifier pump are shown and described herein as they could be used to pump a cryogenic material (e.g., liquid nitrogen) at pressures in the range of about 4,000 psig to about 65,000 psig, such as may be required to operate a high pressure cutting and abrading system of the type shown and described in U.S. Pat. No. 5,456,629 entitled "Method and Apparatus for Cutting and Abrading with Sublimable Particles and U.S.

Pat. No. 5,733,174, entitled Method and Apparatus for Cutting, Abrading, and Drilling with Sublimable Particles and Vaporous Liquids, which are incorporated herein by reference for all that they disclose. However, the high pressure intensifier pump is not limited to use in such applications and for pumping such cryogenic materials. Indeed, the high pressure intensifier pump may be used to pump almost any liquid material in any of a wide variety of applications now known or that may be developed in the future, as would be obvious to persons having ordinary skill in the art after having become familiar with the teachings of the present invention. Consequently, the present invention should not be regarded as limited to the particular materials and applications shown and described herein.

With the foregoing considerations in mind, one embodiment of the high pressure intensifier pump 10 is shown in FIG. 1 and may comprise a pump body 12 having a cylindrical bore 14 therein sized to receive a piston 16. In one preferred embodiment, the pump body 12 may comprise a high pressure barrel 76 and an end cap 78 sized to fit over the end 80 of the high pressure barrel 76 in the manner best seen in FIG. 1. The high pressure barrel 76 and end cap 78 may be mounted to the hydraulic cylinder housing 70 by any of a wide range of mounting systems and devices. For example, in one preferred embodiment, the high pressure barrel 76 and end cap 78 may be mounted to the hydraulic cylinder housing 70 by a plurality of tie rods (not shown) external to the pump body 12 and hydraulic cylinder housing 70. However, since such mounting arrangements are well-known in the art and could be easily provided by persons having ordinary skill in the art, the particular mounting arrangement utilized in one preferred embodiment will not be described in further detail herein.

The high pressure barrel 76 and end cap 78 may be sized to receive a high pressure sleeve 82. The high pressure sleeve 82 may be secured to the high pressure barrel 76 by means of threads 84 provided in the end cap 78 and high pressure sleeve 82. The threaded engagement of the high pressure sleeve 82 and end cap 78 allows the high pressure sleeve 82 to be easily and quickly removed to service the sleeve seal assembly 22 without the need to disassemble the entire pump body 12.

The high pressure sleeve 82 may be provided with a cylindrical bore 14 therein which is sized to receive the piston 16. The distal end 34 of the bore 14 may be fluidically connected to a valve assembly 36 by means of a passage 38. In one preferred embodiment, the valve assembly 36 comprises an integral portion of the high pressure sleeve 82, although it could comprise a separate assembly that may be attached to the passageway 38 by any convenient means, as would be obvious to persons having ordinary skill in the art. In accordance with the foregoing, then, the present invention should not be regarded as limited to a configuration wherein the valve assembly 36 comprises an integral portion of the high pressure sleeve 82.

Regardless of whether the valve assembly 36 comprises an integral portion of the high pressure sleeve 82 or whether it comprises a separate component, the valve assembly 36 may comprise an inlet valve assembly 40 and an outlet valve assembly 42. The inlet valve assembly 40 may comprise a ball-type check valve in which a spherical ball 86 is allowed to float or move slightly between a seat 88 and a ball retainer 90 provided in inlet passage 92. The inlet passage 92 may be connected to a suitable inlet pipe 94 by any of a wide variety of connector systems well-known in the art and that are readily commercially available. The inlet check valve 40 operates according to well-known principles to allow the working fluid 66 to enter the pump 10, but prevent it from flowing back into the inlet pipe 94. That is, when the pressure in the pump 10 is less than the pressure of the working fluid 66 in the inlet pipe 94, the working fluid will push the ball 86 upward against the ball retainer 90, thereby unseating the ball 86 and allowing the working fluid 66 to enter the pump 10. Conversely, if the pressure in the pump 10 exceeds the pressure in the inlet pipe 94, the working fluid 66 in the pump will move the ball 86 against seat 88, thereby preventing the working fluid 66 from re-entering the inlet pipe 94.

The outlet valve assembly 42 may also comprise a ball-type check valve in which a spherical ball 96 is allowed to float or move slightly between a seat 98 and a ball retainer, such as may be formed by outlet fitting 99 secured within an outlet passage 11. The outlet passage 11 may be connected to a suitable outlet pipe 13 by any of a wide variety of connector systems well-known in the art and that are readily commercially available. The outlet check valve 42 operates according to well-known principles to allow the working fluid to exit the pump 10 via the outlet pipe 13, but prevent it from flowing back into the pump 10.

The various components of the pump body 12 just described may be made from any of a wide range of materials suitable for the intended application. By way of example, in one preferred embodiment, the high pressure barrel 76 and end cap 78 are made from any of a wide range of stainless steels that are well-known in the art and readily commercially available. Similarly, the high pressure sleeve 82 is made from stainless steel. Alternatively, other materials may also be used for these components. The dimensions of the various components comprising the pump body 12 also will vary depending on the particular pump 10 in which they are to be used. Consequently, the present invention should not be regarded as limited to pump body components having any particular size or range of sizes. However, by way of example, in one preferred embodiment, the cylindrical bore 14 may have a diameter of about 1.5 inches, and an overall length (i.e., distance between the proximal end 24 and distal end 34 of about 12 inches. Similarly, the wall thicknesses of the high pressure barrel 76 and the high pressure sleeve 82 will vary depending on the type of material used to fabricate these components as well as on the operating pressure of the pump. In one preferred embodiment, wherein the pump 10 is to be used to pump liquid nitrogen at pressures of about 65,000 psig, the high pressure barrel 76 may have a wall thickness in the range of about 1–2 inches, whereas the high pressure sleeve 82 may have a wall thickness of about 1.5 inches.

The piston 16 may comprise a generally elongate, cylindrical member mounted for reciprocation in the cylindrical bore 14 provided in the high pressure sleeve 82 so that the piston 16 may be moved between a retracted position 18 and an extended position 20, as best seen in FIG. 1. It is generally preferred, but not required, that the crown 74 of piston 16 be provided with an elongate rod member 15 that extends outwardly from the piston crown 74 and is sized to be received by the passageway 38. The rod 15 occupies a substantial portion of the "dead volume" contained within the passageway 38 when the piston 16 is in the fully extended position 20, thereby increasing the volumetric efficiency of the pump 10. The piston 16 may also be provided with a piston seal assembly 26, as will be described in greater detail below.

The piston 16 may be reciprocated back and forth (i.e., generally in the directions indicated by arrow 72) within the high pressure sleeve 82 by any of a wide range of devices or systems (e.g., cam or crank actuators or by a hydraulic piston) well-known in the art for operating the pistons of such high pressure intensifier pumps. Accordingly, the present invention should not be regarded as limited to any particular device or system for reciprocating the piston 16. However, by way of example, in one preferred embodiment, the proximal end 68 of piston 16 may be connected directly to a hydraulic piston (not shown) mounted for reciprocation within a hydraulic cylinder housing 70, a portion of which is shown in FIG. 1. It is generally preferred, but not required, that the surface area of the face of the hydraulic piston be made larger than the area of the crown 74 of the high pressure piston 16. Enlarging the surface area of the face of the hydraulic piston allows a relatively low pressure hydraulic fluid to produce higher discharge pressures for the pump 10, as is well known. A hydraulic control system (not shown) may be used to reciprocate the hydraulic piston within the hydraulic cylinder housing 70, thereby reciprocating the piston 16 within the cylindrical bore 14 of high pressure sleeve 82. One or more seals 17 may be provided in the hydraulic cylinder housing 70 to prevent hydraulic fluid (not shown) from entering the pump 10 and to prevent the material 66 contained in the high pressure pump 10 from entering the hydraulic cylinder. A vent hole 19 may be provided in the housing 70 to allow any hydraulic fluid leaking past the seal 17 to be drained away. A similar vent 21 may be provided between the hydraulic cylinder housing 70 and the pump body 12 to allow any of the working material 66 leaking past the pump seals (e.g., piston seal assembly 26 and sleeve seal assembly 22) to be drained away.

As mentioned above, since such hydraulic drive arrangements are well-known in the art for operating the pistons of high pressure intensifier pumps, and since a detailed description of such a hydraulic drive system is not required to understand or practice the present invention, the particular hydraulic drive system utilized in one preferred embodiment to reciprocate the piston 16 within the cylindrical bore 14 will not be described in further detail herein.

The piston 16 may be made from any of a wide range of materials suitable for the intended application. Accordingly, the present invention should not be regarded as limited to pistons comprising any particular material. However, by way of example, in one preferred embodiment, the piston 16 is made from stainless steel, as is the elongate rod 15. The hydraulic piston (not shown) mounted to the proximal end 68 of piston 16 may comprise an integral portion of piston 16. Alternatively, the hydraulic piston (not shown) may comprise a separate component that is then mounted to the proximal end 68 of piston 16. The dimensions of the piston 16 will, of course, vary depending on the particular application in which the pump is to be used. Consequently, the present invention should not be regarded as limited to a piston having any particular diameter. However, by way of example, the piston 16 in one preferred embodiment has a diameter of about 6 inches.

The sleeve seal assembly 22 used to seal the gap (not shown) between the piston 16 and the cylindrical bore 14 is best seen in FIG. 2 and may comprise a plurality of ring-shaped sleeve seal members 44 positioned within a recessed section 46 provided in the proximal end 24 of the high pressure sleeve 82. It is preferred, but not required, that the recessed section 46 be tapered from a large diameter end 48 located at the proximal end 24 of high pressure sleeve 82 to a small diameter end 50. A spring 52, such as a Belleville washer, may be positioned in the recessed section 46 so that it urges the sleeve seal members 44 toward the small diameter end 50. Alternatively, other types of spring members, such as wave springs or compression springs may also be used. A suitable retainer, such as a spring clip 54, may be used to retain the Belleville washer within the recessed section 46.

The number of sleeve seal members 44 comprising the sleeve seal assembly 26 depends to some degree on the particular application and the pressures involved. Generally speaking, however, the number of sleeve seals 44 comprising the sleeve seal assembly 22 may be in the range of one (1) to seven (7) seals, with three (3) seals 44 being preferred.

The amount of taper provided to the recessed section 46 should be sufficient to allow the sleeve seal members 44 to more tightly contact the piston 16 as they are urged toward the small diameter end 50 and to allow the sleeve seal assembly 22 to compensate for a reasonable degree of seal wear. By way of example, in one preferred embodiment, the large diameter end 48 of tapered recess 46 may have a diameter of about 1 inch, whereas the small diameter end 50 may have a diameter of about 0.8 inches. The length of the recessed section 46 (i.e., the distance between the large and small diameter ends 48 and 50) may be about 1 inch. The exact amount of taper that will be suitable for a particular pump design depends to some degree on the pressures involved. For example, deeper or more pronounced tapers are generally preferred for low pressure applications whereas shallow or less pronounced tapers are generally preferred for high pressures. Consequently, the high pressure intensifier pump according to the present invention should not be regarded as limited to the particular tapers shown and described herein.

Figure 4:
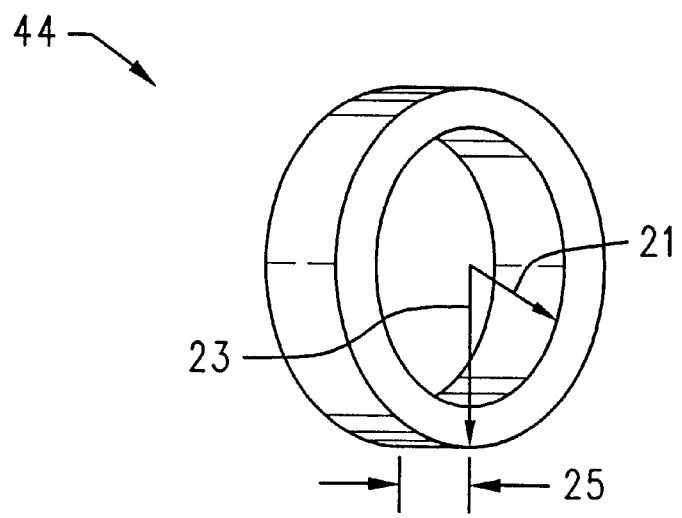
FIG. 4 is a perspective view of a sleeve seal member.

Referring now to FIG. 4, each sleeve seal member 44 may be essentially identical to the others and may comprise a generally ring-shaped member having an inside diameter 21, an outside diameter 23, and a thickness 25. The dimensions of each sleeve seal member 44 may vary depending on the particular design of the pump 10 in which the seals are to be utilized. Consequently, the present invention should not be regarded as being limited to sleeve seal members 44 having any particular dimensions. By way of example, in one preferred embodiment, each sleeve seal member 44 may have an inside diameter 21 of about 1.5 inches, an outside diameter 23 of about 1.9 inches, and a thickness 25 of about 0.15 inches. The seal members 44 may be made from any of a wide range of materials suitable for the type of material to be pumped. By way of example, in one preferred embodiment wherein the working material 66 is liquid nitrogen, each seal member 44 may be fabricated from ultra-high molecular weight polyethylene (UHMWPE). Alternatively, other materials now known or that may be developed in the future may also be used for the sleeve seal members 44.

Referring back now to FIGS. 2 and 3, the piston seal assembly 26 may comprise a plurality of ring-shaped piston seal members 56 sized to be received by the circumferential groove 58 provided in the piston 16. It is generally preferred, but not required, that the circumferential groove 58 be tapered from a large diameter end 60 to a small diameter end 62, in the manner best seen in FIG. 4. It is also generally preferred that the small diameter end 62 of the tapered circumferential groove be located nearest the crown 74 of piston 16 so that the pressurized fluid 66 will urge the piston seal members 56 toward the large diameter end 60. Such an arrangement allows the piston seal members 56 to be "self-energizing." That is, the higher the fluid pressure, the more tightly the piston seal members 56 will contact the cylindrical bore 14, as was explained above.

The amount of taper provided to the circumferential groove 58 should be sufficient to allow the piston seal members 56 to more tightly contact the cylindrical bore 14 as they are urged toward the large diameter end 60 and to allow the piston seal assembly 26 to compensate for a reasonable degree of seal wear. By way of example, in one preferred embodiment, the large diameter end 60 of the circumferential groove 58 may have a diameter of about 2 inches, whereas the small diameter end 62 may have a diameter of about 1.8 inches. The length of the circumferential groove 58 (i.e., the axial distance between the large and small diameter ends 60 and 62) may be about 1 inch. Alternatively, other tapers may also be used, as was discussed above.

Each piston seal member 56 may be essentially identical to the others and may comprise a ring shaped member having an inside diameter 27, an outside diameter 29, and a thickness 31. See FIG. 5. Each piston seal member 56 also may be provided with an "s" shaped gap or slot 64 therein to allow the seal member 56 to expand slightly in the radial direction. Significantly, the "s" shaped gap or slot 64 allows the seal member 56 to expand radially, but without substantially reducing the thickness 31 of the seal member, which may otherwise be the case.

The dimensions of each piston seal member 56 may vary depending on the particular design and capacity of the pump 10 in which the seals are to be utilized. Consequently, the present invention should not be regarded as being limited to piston seal members 56 having any particular dimensions. By way of example, in one preferred embodiment, each piston seal member 56 may have an inside diameter 27 of about 1 inch, an outside diameter 29 of about 1.4 inches, and a thickness 31 of about 0.15 inches. The piston seal members 56 may be made from any of a wide range of materials suitable for the type of material to be pumped. By way of example, in one preferred embodiment wherein the working material 66 is liquid nitrogen, each seal member 56 may be fabricated from UHMWPE. Alternatively, other materials now known or that may be developed in the future may also be used for the piston seal members 56, as would be obvious to persons having ordinary skill in the art after having become familiar with the teachings of the present invention.

As was briefly described above, the pump body 12 may be surrounded by a cooling jacket 28 which defines an annulus 33 adjacent the pump body 12. A coolant 30 contained in the annulus 33 cools the pump body 12 in order to maintain it at a predetermined temperature or within a predetermined temperature range. In the embodiment shown and described herein, the cooling jacket 28 may be provided with a coolant inlet conduit 35 and a coolant outlet conduit 37 which may be used to provide a continuous supply of coolant 30 to the annulus 33 defined between the cooling jacket 28 and the pump body 12. The cooling jacket 28 may be made from any of a wide range of materials suitable for the intended application. In one preferred embodiment, the cooling jacket 28 is fabricated from stainless steel, which may then be secured to the high pressure barrel 80 by any convenient fastening system or device, e.g., such as by welding. Alternatively, other materials and mounting arrangements could be used, as would be obvious to persons having ordinary skill in the art.

The cooling jacket 28 maybe surrounded by an insulating jacket 32 in the manner best seen in FIG. 1. The insulating jacket 32 reduces the heat transferred between the cooling jacket 28 and the surrounding environment. In one preferred embodiment, the insulating jacket 32 defines an annulus 39 around the cooling jacket 28. The annulus 39 may then be evacuated to reduce heat transfer due to convection. Alternatively, other types of insulators, (e.g., insulating blankets or coatings) may also be used, as would be obvious to persons having ordinary skill in the art.

If the insulating jacket 32 comprises a vacuum chamber, as described above, then the jacket 32 should be made from a rigid material (e.g., metal) to prevent it from collapsing when the annulus 39 is evacuated. By way of example, in one preferred embodiment, the insulating jacket 32 is fabricated from stainless steel and is welded to the cooling jacket 28. Alternatively, other materials and configurations may be used, as would be obvious to persons having ordinary skill in the art after having become familiar with the teachings of the present invention.

The operation of the high pressure intensifier pump 10 according to the present invention may be best understood by considering a specific example. Consider an application wherein the pump 10 is to be used to pump liquid nitrogen (i.e., the working fluid 66) provided to the inlet 40 of pump 10 at a pressure in the range of about 100 psig to about 15,000 psig. As was described above, any of a wide range of low or intermediate pressure pump systems (not shown) that are well-known in the art and readily commercially available may be used to supply liquid nitrogen at such pressures.

Before operating the pump 10, the cooling jacket 28 may be filled with the coolant 30 desired for the particular application. For example, in the embodiment shown and described herein, the coolant 30 circulating within the cooling jacket 28 may comprise liquid nitrogen, which is also the material being pressurized by the pump 10. The liquid nitrogen coolant 30 may be provided by the same low pressure pump system (not shown) used to provide the liquid nitrogen to the pump inlet valve 40.

The pump 10 may be placed in operation by actuating the hydraulic control system (not shown) as necessary to cause the hydraulic piston attached to the proximal end 68 of piston 16 to be reciprocated within the hydraulic cylinder housing 70 (only a portion of which is shown in FIG. 1). The hydraulic piston thus moves the high pressure piston 16 back and forth (i.e., in the directions indicated by arrows 72) within the bore 14 of pump body 12, reciprocating the piston 16 between the retracted position 18 and the extended position 20.

As the piston 16 moves toward the retracted position 18, it draws in liquid nitrogen 66 from the inlet pipe 94 and through the inlet check valve 40, thereby filling the expanding space between the piston crown 74 and the cylinder bore 14. Once the piston 16 is in the fully retracted position 18, the hydraulic control system (not shown) reverses the pressure on the hydraulic piston (not shown) connected to the proximal end 68 of piston 16, thereby reversing the direction of the piston 16. As the piston 16 advances toward the extended position 20, it compresses the liquid nitrogen 66, ultimately discharging it through the outlet check valve 42 and outlet pipe 13.

The first seal encountered by the liquid nitrogen 66 as it is being pressurized is the piston seal assembly 26. Generally speaking, the piston seal assembly 26 forms the primary seal, allowing little or substantially none of the liquid nitrogen to leak past the seal assembly 26. Since the pressure of the liquid nitrogen 66 contained within the cylinder 14 is greater than the pressure on the other side of the piston seal assembly 26, the liquid nitrogen 66 exerts a net "backward" pressure or force on the piston seal members 56. This backward pressure or force urges the seal members 56 toward the large diameter end 60 of the tapered circumferential groove 58. The taper in the circumferential groove 58 causes the seal members 56 to contact more tightly the cylinder bore 14, thereby improving the effectiveness of the piston seal assembly 26.

While the piston seal assembly 26 will effectively seal the piston 16 and cylinder bore 14 in most cases, circumstances may exist, particularly when pumping low temperature cryogenic materials (e.g., liquid oxygen), in which the piston seal members 56 contract to such an extent that they can no longer effectively seal the piston 16, even though the tapered circumferential groove 58 compensates for some degree of shrinkage of the seals 56. If so, the sleeve seal assembly 22 takes over as the primary seal. Referring now to FIG. 2, any working fluid 66 (e.g., liquid oxygen) that leaks past the piston seal assembly 26 in a low temperature application will encounter the various sleeve seal members 44 comprising the sleeve seal assembly 22. While the sleeve seal members 44 also experience shrinkage due to the low temperature, the shrinkage of the sleeve seal members 44 causes them to more tightly contact the piston 16, which generally improves the effectiveness of the sleeve seal assembly 22. The spring member 52, which biases the sleeve seal members 44 toward the small diameter end 50 of the recessed section 46, further increases the pressure exerted by the seal members 44 on the piston 16, thereby further enhancing the effectiveness of the sleeve seal assembly 22.

Figure 6:
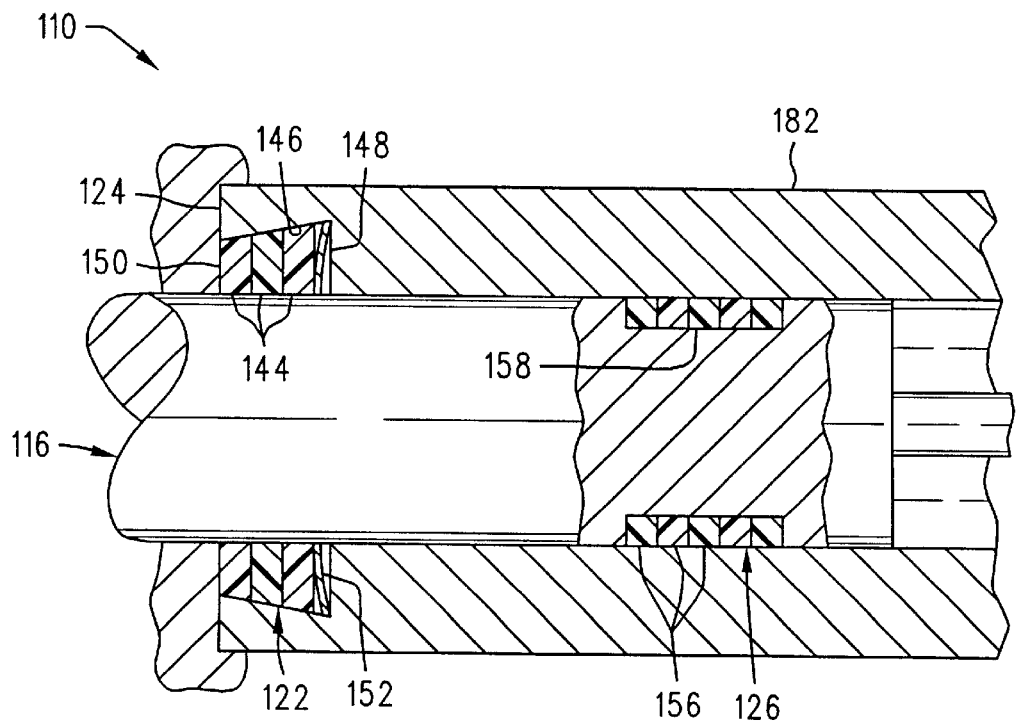
FIG. 6 is an enlarged sectional view in elevation of a second embodiment of the high pressure intensifier pump having modified sleeve and piston seal assemblies.

As mentioned above, the high pressure intensifier pump apparatus according to the present invention may be provided with different features depending on the intended application. For example, a second embodiment 110 of a high pressure intensifier pump may have modified sleeve seal and piston seal assemblies 122 and 126, as best seen in FIG. 6. The sleeve seal assembly 122 is similar to the sleeve seal assembly 22 shown and described above, except that the sleeve seal assembly 122 utilized in the second embodiment includes a recessed section 146 that is tapered in the opposite direction. That is, the recessed section 146 is tapered from a large diameter end 148 to a small diameter end 150, with the small diameter end 150 being located at the proximal end 124 of high pressure barrel 182. A plurality of sleeve seal members 144 may be provided within the tapered recess 146 and may be biased toward the small diameter end 150 by a spring member 152, such as a Belleville washer. The sleeve seal members 144 may be substantially identical to the sleeve seal members 44 already described and shown in detail in FIG. 4. Accordingly, the sleeve seal members 144 will not be described in further detail herein.

The reverse taper of the recessed section 146 allows the sleeve seal to be "self-energizing." That is, any fluid (not shown) that leaks past the piston seal assembly 126 will urge the sleeve seal members 144 toward the small diameter end 150 of tapered recess 146. The pressure force exerted by the fluid (not shown) on the sleeve seal members 144 is in addition to the biasing force provided by the spring member 152. The biasing force provided by both the fluid pressure and the spring pressure, along with the taper provided to the recessed section 146 increases seal effectiveness by causing the sleeve seal members 144 to more tightly contact the piston 116 as the sleeve seal members 144 are urged toward the small diameter end 150 of the recessed section 146. This same combination of elements also helps to compensate for wear of the sleeve seals 144 in the manner already described above for the sleeve seal members 44.

The piston seal assembly 126 differs from the piston seal assembly 26 described above for the first embodiment in that the second embodiment of the piston seal assembly 126 does not include a tapered circumferential groove. Instead, the second embodiment 126 of the piston seal assembly is provided with a straight or plain circumferential groove 158 having no taper. The circumferential groove 158 may be sized to receive a plurality of piston seal members 156 which may be substantially identical to the piston seal members 56 described above and shown in FIG. 5. Alternatively, the "s" shaped gap (e.g., 64) may be omitted from the piston seal members 156, since they will not generally be subjected to expansion in the radial direction since the circumferential groove 158 is not tapered.

Figure 7:
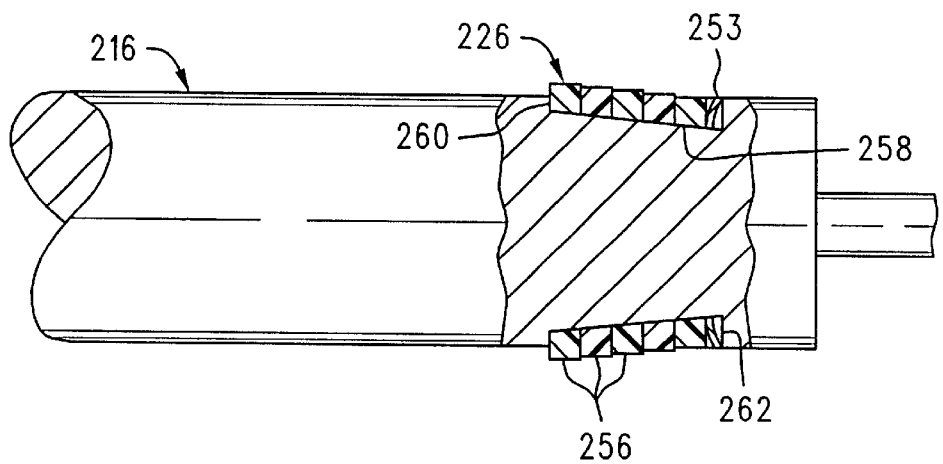
FIG. 7 is an enlarged sectional view of the piston showing another embodiment of a piston seal assembly.

Still other embodiments of the piston seal assembly are possible. For example, any embodiment (e.g., 10, 110) of the pump assembly according to the present invention may be provided with a third embodiment 226 of a piston seal assembly, as best seen in FIG. 7. This third embodiment 226 of the piston seal assembly is similar to the first embodiment 26 described above in that the piston 216 may be provided with a circumferential groove 158 that is tapered from a large diameter end 260 to a small diameter end 262. A plurality of piston seal members 256 may be provided in the circumferential groove 258 in the same manner as for the first embodiment of the piston seal assembly 26. However, the third embodiment 226 of the piston seal assembly may also be provided with a spring member 253 to urge the piston seal members 256 toward the large diameter end 260 of the circumferential groove 258. The bias force provided by the spring member 253 will be in addition to any pressure force provided by the pressurized fluid (not shown), thereby further enhancing the effectiveness and wear compensation properties of the piston seal assembly 226.

The spring member 253 may comprise any of a wide variety of spring devices, such as Belleville washers and wave washers, suitable for the intended application. By way of example, in one preferred embodiment, the spring member 253 comprises a Belleville washer. The piston seal members 256 may be identical to the piston seal members 56 shown and described above for the first embodiment of the pump 10.

It is contemplated that the inventive concepts herein described may be variously otherwise embodied and it is intended that the appended claims be construed to include alternative embodiments of the invention except insofar as limited by the prior art.

We claim:

1. Pump apparatus, comprising:
    a pump body having a bore therein, said bore having a recessed section located at a first end of said bore, the recessed section being tapered from a large diameter end to a small diameter end;
    a piston mounted for reciprocation between first and second positions within the bore in said pump body;
    a sleeve seal assembly mounted within the recessed section of the bore in said pump body so that said sleeve seal assembly contacts said piston; and
    a piston seal assembly mounted to said piston so that said piston seal assembly contacts the bore in said pump body, said piston seal assembly being mounted to said piston at a location so that said piston seal assembly does not contact said sleeve seal assembly as said piston is reciprocated between the first and second positions within the bore of said pump body.

2. The pump apparatus of claim 1, wherein said sleeve seal assembly comprises a plurality of ring-shaped members.

3. The pump apparatus of claim 2, further comprising a spring positioned adjacent said plurality of ring-shaped members for urging said plurality of ring-shaped members toward the small diameter end of said recessed section.

4. Pump apparatus, comprising:
a pump body having a bore therein;
a piston mounted for reciprocation between first and second positions within the bore in said pump body, wherein said piston includes a tapered circumferential groove therein having a large diameter end and a small diameter end and wherein said piston seal assembly is mounted within said circumferential groove;
a sleeve seal assembly mounted to said pump body so that said sleeve seal assembly contacts said piston; and
a piston seal assembly mounted to said piston so that said piston seal assembly contacts the bore in said pump body, said piston seal assembly being mounted to said piston at a location so that said piston seal assembly does not contact said sleeve seal assembly as said piston is reciprocated between the first and second positions within the bore of said pump body.

5. The pump apparatus of claim 4, wherein said piston seal assembly comprises a plurality of ring-shaped members.

6. The pump apparatus of claim 5, further comprising a spring positioned adjacent said plurality of ring-shaped members for urging said plurality of ring-shaped members toward the large diameter end of said groove.

7. The pump apparatus of claims 1 or 4, further comprising a cooling jacket surrounding said pump body.

8. The pump apparatus of claim 7, wherein said cooling jacket comprises a generally closed chamber having a cooling fluid inlet and a cooling fluid outlet.

9. The pump apparatus of claim 8, further comprising an insulating jacket surrounding said cooling jacket.

10. The pump apparatus of claim 9, wherein said insulating jacket comprises a generally closed vacuum chamber.

11. The pump apparatus of claim 1, wherein said sleeve seal assembly comprises:
a ring-shaped seal member positioned within a recessed section provided in the cylinder at an axial location so that the piston remains always adjacent the recessed section as the piston reciprocates within the cylinder, the recessed section being tapered from a large diameter end to a small diameter end; and
a spring positioned adjacent said ring-shaped seal member for urging said ring-shaped seal member toward the small diameter end of the recessed section.

12. The pump apparatus of claim 1, wherein said piston seal assembly comprises:
a ring-shaped seal member positioned within a circumferential groove provided in the piston, the circumferential groove being tapered from a large diameter end to a small diameter end; and
a spring positioned adjacent said ring-shaped seal member for urging said ring-shaped seal member toward the large diameter end of the circumferential groove.

13. The pump apparatus of claim 12, wherein said ring-shaped seal member comprises an inside surface, an outside surface, a front side, and a back side, said ring-shaped seal member having an "s" shaped gap therein extending between the front side and the back side of said ring-shaped seal member, said "s" shaped gap allowing said ring-shaped seal member to expand radially.

14. The piston seal assembly of claim 13, wherein said ring-shaped seal member comprises an inside surface, an outside surface, a front side, and a back side, said ring-shaped seal member having an "s" shaped gap therein extending between the front side and the back side of said ring-shaped seal, said "s" shaped gap allowing said ring-shaped seal member to expand radially.

15. Pump apparatus, comprising:
a pump body having a first end, a second end, and a bore therein, the bore extending from the first end of said pump body, the first end of said pump body having a recessed section therein that is tapered from a large diameter end to a small diameter end;
a piston mounted for reciprocation between first and second positions within the bore in said pump body, said piston having a circumferential groove therein;
a ring-shaped sleeve seal member mounted in the recessed section of said pump body so that said ring-shaped sleeve seal member contacts said piston;
a sleeve seal spring mounted adjacent said ring-shaped sleeve seal member for urging said ring-shaped sleeve seal member toward the small diameter end of the recessed section; and
a ring-shaped piston seal member mounted in the circumferential groove in said piston so that said ring-shaped piston seal member contacts the bore in said pump body.

16. Pump apparatus, comprising:
a pump body having a bore therein, said bore having a recessed section located at a first end of said bore, the recessed section being tapered from a large diameter end to a small diameter end;
a piston mounted for reciprocation between first and second positions within the bore in said pump body;
sleeve seal means mounted within the recessed section of the bore in said pump body for sealingly engaging said piston as said piston is reciprocated within the bore in said pump body; and
piston seal means mounted to said piston for sealingly engaging the bore in said pump body, said piston seal means being mounted to said piston at a location so that said piston seal means does not contact said sleeve seal means as said piston is reciprocated within the bore of said pump body.

17. The pump apparatus of claim 16, further comprising cooling jacket means surrounding said pump body for maintaining said pump body within a predetermined temperature range.

18. The pump apparatus of claim 17, further comprising insulating jacket means surrounding said cooling jacket means for reducing heat transfer between said cooling jacket means and a region surrounding said cooling jacket means.

19. A sleeve seal assembly for sealing a gap between a cylinder and a piston mounted for reciprocation with the cylinder, comprising:
a ring-shaped seal member positioned within a recessed section provided in the cylinder at an axial location so that the piston remains always adjacent the recessed section as the piston reciprocates within the cylinder, the recessed section being tapered from a large diameter end to a small diameter end; and
a spring positioned adjacent said ring-shaped seal member for urging said ring-shaped seal member toward the small diameter end of the recessed section.

20. A method for sealing a gap between a cylinder and a piston mounted for reciprocation within the cylinder, comprising:
providing a recessed section in the cylinder at an axial location so that the piston remains always adjacent the recessed section as the piston reciprocates within the cylinder, the recessed section being tapered from a large diameter end to a small diameter end;

positioning a ring-shaped seal member in the recessed section of the cylinder, the ring-shaped seal member being sized to contact the piston; and urging the ring-shaped seal member toward the small diameter end of the recessed section as the piston reciprocates within the cylinder.

21. A piston seal assembly for sealing a gap between a cylinder and a piston mounted for reciprocation with the cylinder, comprising:

a ring-shaped seal member positioned within a circumferential groove provided in the piston, the circumferential groove being tapered from a large diameter end to a small diameter end; and a spring positioned adjacent said ring-shaped seal member for urging said ring-shaped seal member toward the large diameter end of the circumferential groove.

22. A method for sealing a gap between a cylinder and a piston mounted for reciprocation within the cylinder, comprising:

providing a circumferential groove in the piston, the circumferential groove being tapered from a large diameter end to a small diameter end;

positioning a ring-shaped seal member in the circumferential groove, the ring-shaped seal member being sized to contact the cylinder; and urging the ring-shaped seal member toward the large diameter end of the circumferential groove as the piston reciprocates within the cylinder.

* * * * *